W. F. KIESEL, Jr.
LOCOMOTIVE.
APPLICATION FILED AUG. 20, 1914.
1,162,243.
Patented Nov. 30, 1915.
2 SHEETS—SHEET 2.
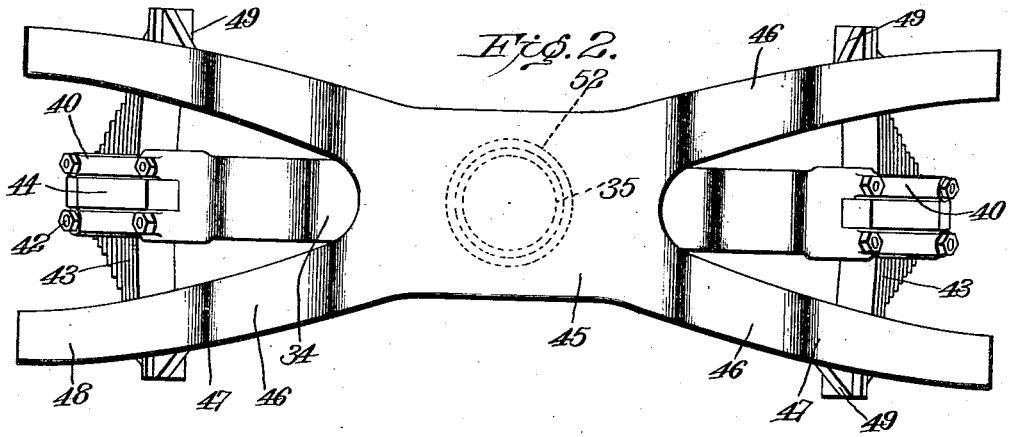
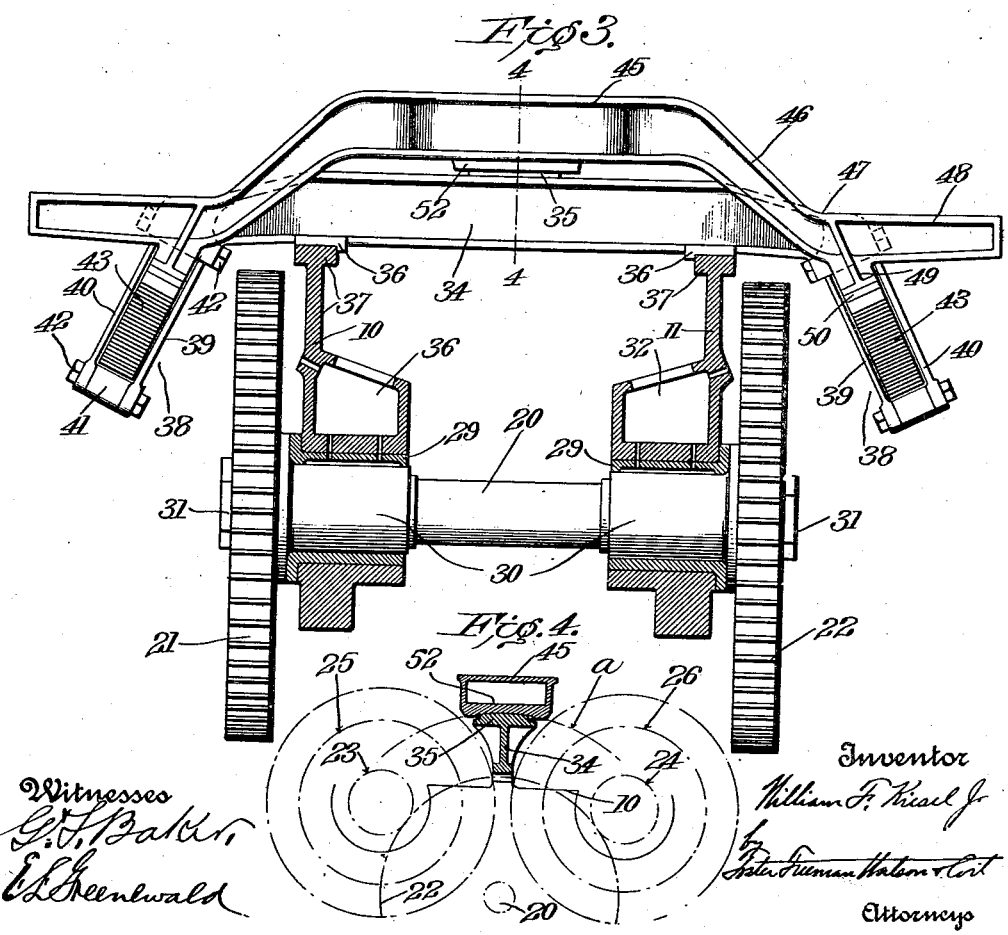

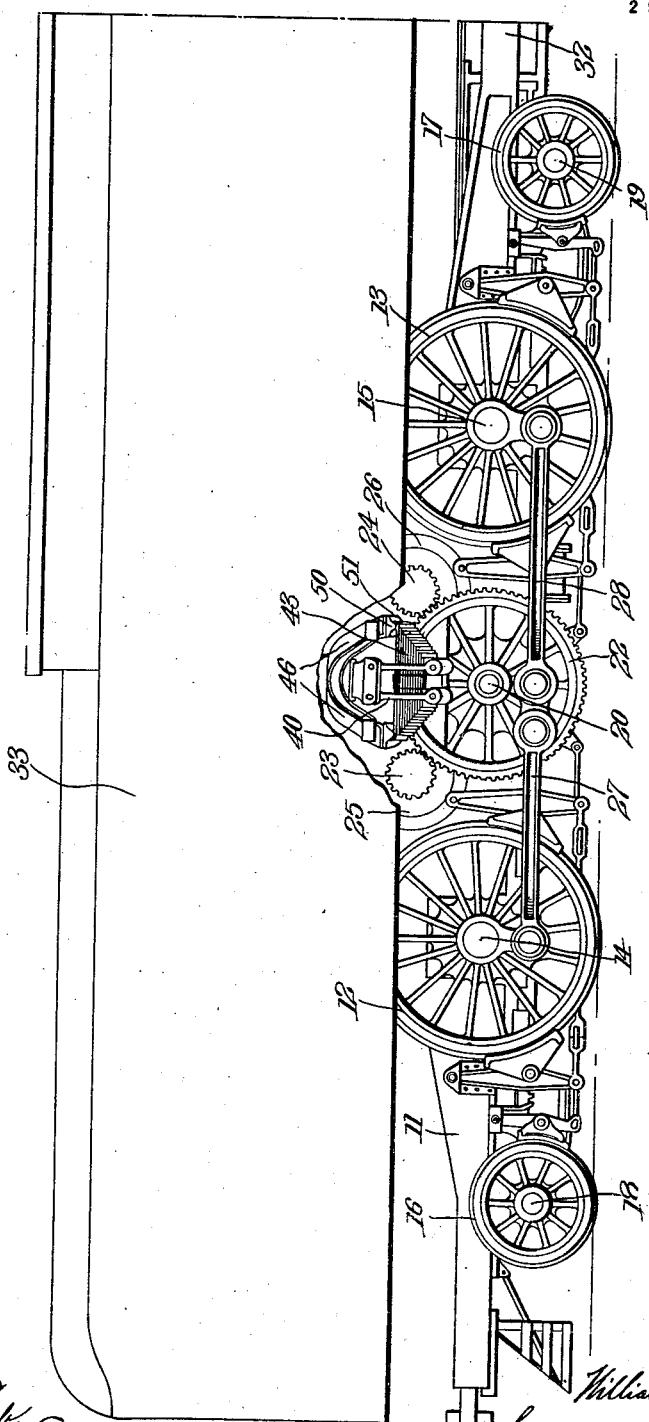

UNITED STATES PATENT OFFICE.

WILLIAM F. KIESEL, JR., OF ALTOONA, PENNSYLVANIA.

LOCOMOTIVE.

1,162,243.  Specification of Letters Patent.  Patented Nov. 30, 1915.

Application filed August 20, 1914. Serial No. 857,718.

*To all whom it may concern:*

Be it known that I, WILLIAM F. KIESEL, Jr., a citizen of the United States, and resident of Altoona, Blair county, State of Pennsylvania, have invented certain new and useful Improvements in Locomotives, of which the following is a specification.

My invention relates to locomotives and particularly to a cab supporting arrangement for that type of electric locomotive wherein two independent trucks are provided to carry the weight of the locomotive cab.

On account of the motors taking up the central space between the drivers and their axles, the supporting means for the cab must be located very high. Such an elevated location of the cab and its support has been found to subject the cab to vibrations which greatly impede the proper functioning of the electrical apparatus within the cab.

The object of my invention is to provide supporting means for the weight of the cab to reduce the vibrations therein to a minimum.

A further object of my invention is to provide means whereby the stress in the supporting devices is limited.

Another object of my invention is to so design the support between the truck and the body or cab that the motion between the two both longitudinally and transversely will be substantially around the center of the jack shaft driven by the motors or approximately around a point corresponding to the intersection of the center line through the draft rigging and transverse vertical plane through the center of the truck or truck bolster.

The above and other objects and the novel features of my invention will be apparent from the following description taken in connection with the drawings, in which;

Figure 1 is a side elevation of substantially one-half of an electric locomotive embodying my invention; Fig. 2 is an enlarged plan view of one pair of body and truck bolsters and their connections; Fig. 3 is a side elevation of the pair of bolsters shown in Fig. 2 and showing their location on the frames and position with reference to the jack shaft; and Fig. 4 is a transverse section on the line 4—4 of Fig. 3, showing the location of the bolsters with respect to the gears on the jack shaft and the motors driving them.

Referring to the drawings, and particularly to Fig. 1, each half of the truck of the electric locomotive or engine consists of parallel side frame members 10 and 11, two pairs of driving wheels 12 and 13 mounted on the axles 14 and 15, two pony trucks comprising the pairs of pony truck wheels 16 and 17 mounted on the pony truck axles 18 and 19, and a jack shaft 20 between and substantially in line with the axles 14 and 15 and carrying at its ends two gear wheels 21 and 22 into which the pairs of pinions 23 and 24 on the axles of the motors 25 and 26 mesh. Each of the gear wheels 21 and 22 is connected by suitably located connecting rods 27 and 28 with the pairs of driving wheels 12 and 13 respectively.

As fully shown and described in a copending application, the frame members 10 and 11 are provided with suitable holes to receive phosphor bronze bearing sleeves 29 which rotatably support hollow bosses or hubs 30 on the inner sides and integral with the gear wheels. The interior of the hubs 30 taper to receive the tapering ends of the jack shaft 20 and the ends of the jack shaft are threaded to receive the nuts 31 to draw the tapering parts together and secure the shaft and gears in place in their bearings in the frame members. Lubricating compartments 32 are cast integral with the inner sides of the frame members 10 and 11 and have openings whereby they may be filled from the outside or inside of the frame members and openings in the bottom thereof leading to the bearing surfaces between the sleeves 29 and hubs 30.

The draw bar pull on the locomotive takes effect about 34½ inches above the rail level, and I have made provision at the point 32 below the center line of the cab or body where the two engine halves abut to transfer buffing and tension strains in line with the draw bar. It is therefore desirable to have the side and end motion of each half of the cab around a truck take effect around a center approximately in line with the center line of the draw bar. As the center line of the jack shaft is 36 inches or substantially the same distance above the rail as the center line of the draw bar, I have taken this center as that around which the cab will take its motion.

Two independent trucks, one of which is shown in side elevation in Fig. 1, are provided to carry the weight of the two halves of the locomotive cab, the other half being the same as that shown in Fig. 1 and extending opposite thereto. The cab or body 33 is carried upon supports positioned on the longitudinal center of each truck. The center line of each of the supports is located directly above a jack shaft and comprises a transversely extending truck bolster 34 in the form of an I-beam and having a central protuberance 35 on its top surface. The truck bolster 34 has lugs 36 on opposite sides of the center of its lower surface to engage the upper edges of the side frame members 10 and 11 of the truck, whereby the bolster 34 may be rigidly secured in place on the flanges 37 of the side frame members. The ends of the truck bolster 34 extend beyond and outside the frame members 10 and 11, and beyond the gear wheels 21 and 22, and at their outer ends are provided with saddles or spring hangers 38 which extend downwardly and outwardly at a definite inclination. The spring hangers 38 comprise inner plates 39 and outer plates 40 spaced apart by blocks 41 and bolted together by bolts 42 and embracing a plurality of spring leaves forming the semi-elliptical springs 43 between the bars 39 and 40. The leaves are secured together by a band 44.

Coöperating with each truck bolster 34 is a body or cab bolster or transom 45 made of a single steel casting and having its ends bifurcated to provide limbs. The limbs extend downwardly and laterally from the center line as at 46 to a point 47 substantially in the plane of the truck bolster 34. From thence, the limbs have portions 48 extending laterally and in the plane of the truck bolster 34. On the underside of the limbs near the point 47 where the portion 46 joins the portion 48 of each limb, there are brackets 49 extending laterally and outwardly from the limbs and having curved lugs 50 on the undersides thereof to fit the curved portions 51 at each end of the top leaves of the semi-elliptical springs 43. On its underside and at the center of the transom or body bolster 45, there is a center cap 52 which is curved to fit the top surface of the plate 35 on the upper side of the truck bolster 34. The semi-elliptical springs 43 on each side act as side bearings but instead of presenting friction surfaces which would retard the transverse motion of the truck on curves considerably, the side motion will merely move the spring hangers on the supporting pins. The springs are put in under sufficient compression to support about half the load of the body, the other half resting on the center plate 35. The clearance between the movable part 52 and the stationary part 35 limits the stress in the springs.

Referring to Fig. 4, it will be seen that the surfaces of contact between the cap part 52 of the body bolster and the stationary plate 35 on the truck bolster are spherical. As stated heretofore, it is desirable to have the side and end motion of the cab around the truck take effect around the center approximately in line with the center-line of the draw bar. As the center line of the jack shaft 20 is 36 inches or substantially the same distance as the center line of the draw bar above the rail, I take this center as that around which the cab will take its motion and make the coöperating surfaces of the center plates 52 and 35 spherical and locate the side springs 43 approximately at right angles to a raidal line struck from the center of the jack shaft 20. The motion of the spring ends therefore will be practically in line with the plane of the spring. The center of rotation of the entire structure is preferably the center of the jack shaft which is located substantially in line with the draw bar pull and centers of the driving wheels.

Referring to Fig. 4, it will be observed that the coöperating surfaces of the means whereby the cab is supported from the truck have coöperating engaging surfaces which are curved and form part of the surface of a sphere having its center at the center of the jack shaft, or approximately at the intersection between the center line through the draft rigging and a transverse vertical plane through the center of the bolster or center of the truck. The dotted line $a$ of Fig. 4 indicates the curvature of the coöperating surfaces on the parts 52 and 35 of the body bolster 45 and truck bolster 34, respectively.

The semi-elliptical springs positioned in their inclined planes carry certain dead weights of the cab, forming a cab side bearing supporting structure that adds materially to the easy riding qualities of the locomotive.

While I have shown and described my invention in detail, I do not wish to be limited to the exact arrangement disclosed as it will be apparent that numerous modifications and changes may be made in the details without departing from the spirit of the invention.

Having thus described my invention, what I claim is:

1. In a railway vehicle, the combination of a body or cab, a truck frame, means for supporting the body from said frame comprising a body bolster, a truck bolster, and springs outside the frame and between said bolsters.

2. In a railway vehicle, the combination of a body or cab, a truck frame, means for supporting the body from said frame comprising a body bolster, a truck bolster, and springs between said bolsters and located in planes inclined to the horizontal.

3. In a railway vehicle, the combination of a body or cab, a truck frame, a jack shaft mounted in said frame, and means for supporting the body from the truck comprising devices which have coöperating curved surfaces, said surfaces having the center of the jack shaft as their center of curvature.

4. In a locomotive, the combination of a body or cab, a truck frame, a jack shaft mounted in said frame, a truck bolster supported on said frame, a body bolster, said bolsters having parts fitting one another and contacting on a spherical surface having its center of curvature substantially at the center of the jack shaft.

5. In a locomotive, the combination of a body or cab, truck side frame members, a truck bolster supported thereby, and having its ends extending beyond the side frame members, spring hangers at the ends of said truck bolster, springs carried by said spring hangers, and a body bolster having a part disposed above said truck bolster and parts resting on said springs.

6. In a locomotive, the combination of a body or cab, a truck frame, a truck bolster supported by said frame and having its ends extending beyond the sides of said frame, outwardly and downwardly, inclined spring hangers carried by the ends of said truck bolster, springs mounted on said hangers, and a body bolster between the body and said truck bolster and having parts extending into engagement with said springs.

7. In a locomotive, the combination of a body or cab, a truck frame, a jack shaft mounted in said frame, and means for supporting the body on the truck comprising springs inclined to the horizontal and vertical and movable about the surface of an imaginary sphere having its center substantially at the center of the jack shaft.

8. In a railway vehicle, a body bolster bifurcated at its ends and having a portion of the surface on the underside thereof curved.

9. In a railway vehicle, a body bolster comprising a single casing having a solid portion intermediate its ends and bifurcated and bent at the ends, and a concave surface on the underside of the solid portion.

10. In a railway vehicle, a truck bolster having transversely extending inclined spring hangers at its ends.

11. In a railway vehicle, the combination of a truck bolster having inclined spring hangers at its ends, springs carried by said hangers, said truck bolster having a convex portion on its upper surface, a body bolster having a concave portion on its under surface fitting said convex portion on the truck bolster, said body bolster being bifurcated at its ends, said bifurcations extending downwardly and laterally and having means thereon to engage the springs on the truck bolster.

12. In a locomotive, the combination of truck side frame members, draft rigging therefor, a truck bolster supported by said members, spring hangers at the ends of said bolster and extending outwardly substantially on an inclination corresponding to a tangential plane to an imaginary sphere with a center approximately at the intersection of the center line through the draft rigging and the transverse vertical plane through the center of the truck.

13. In a locomotive, the combination of a body or cab, a truck frame, and means for supporting the body from the truck comprising center plates having coöperating curved surfaces, and side springs, said springs being under sufficient compression to support substantially one-half the weight of the body and one of said center plates supporting the remaining weight of the body.

14. In a locomotive, the combination of a body, a truck frame, draft rigging therefor, a jack shaft located approximately at the intersection of the center line through the draft rigging and the transverse vertical plane through the center of the truck frame, and means for supporting the body from the truck comprising devices which permit motion between the body and truck both longitudinally and transversely approximately around the center of the jack shaft.

15. In a locomotive, the combination of a body or cab, truck frames, a plurality of jack shafts journaled therein substantially in line with the draw bar motors mounted in said frames above said jack shafts, means above the jack shaft and between the motors for supporting the body from the truck frame and comprising devices which permit motion between the body and the truck frame around the centers of the jack shafts both longitudinally and transversely.

16. In a railway vehicle, the combination of a body, a truck frame comprising side frame members, a truck bolster mounted on said members, a body bolster, said truck and body bolsters having contacting curved surfaces near the centers thereof, and springs on opposite sides of said contacting surfaces, said springs being under sufficient compression to support a portion of the weight of the body, the remaining weight being supported at the center where said bolsters are in contact.

17. In a railway vehicle, the combination of a body, a truck therefor, draft rigging on the truck, and contacting plates on the body and truck, said plates provided with contacting curved surfaces the centers of curvature of which lie approximately at the intersection of the center line through the draft rigging and the transverse vertical plane through the center of the truck, said curved surfaces being portions of spherical surfaces.

18. In a railway vehicle, the combination of a body having a center plate thereon, a truck, draft rigging therefor, a truck bolster having a center plate thereon, said plates having curved surfaces which fit one another to support the body on the truck, the center of curvature of said surfaces being approximately at a point corresponding to the intersection of the center-line through the draft rigging and the transverse vertical plane through the center of the truck bolster, said curved surfaces being portions of spherical surfaces.

In testimony whereof I affix my signature in presence of two witnesses.

WILLIAM F. KIESEL, Jr.

Witnesses:
C. R. ATKINSON,
J. T. HANLON.